US009516080B2

(12) United States Patent
Tripathy

(10) Patent No.: US 9,516,080 B2
(45) Date of Patent: Dec. 6, 2016

(54) METHODS AND APPARATUSES FOR STREAMING CONTENT

(71) Applicant: Western Digital Technologies, Inc., Irvine, CA (US)

(72) Inventor: Aurobindo Tripathy, Milpitas, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 752 days.

(21) Appl. No.: 13/931,821

(22) Filed: Jun. 29, 2013

(65) Prior Publication Data

US 2014/0359154 A1  Dec. 4, 2014

Related U.S. Application Data

(60) Provisional application No. 61/829,959, filed on May 31, 2013.

(51) Int. Cl.
| | |
|---|---|
| *H04L 29/06* | (2006.01) |
| *H04N 21/2743* | (2011.01) |
| *H04N 21/432* | (2011.01) |
| *H04N 21/433* | (2011.01) |
| *H04N 21/436* | (2011.01) |
| *H04N 21/63* | (2011.01) |
| *H04N 19/30* | (2014.01) |

(52) U.S. Cl.
CPC .............. *H04L 65/60* (2013.01); *H04L 65/602* (2013.01); *H04N 21/2743* (2013.01); *H04N 21/432* (2013.01); *H04N 21/4325* (2013.01); *H04N 21/4331* (2013.01); *H04N 21/43622* (2013.01); *H04N 21/631* (2013.01); *H04L 65/4069* (2013.01); *H04L 65/607* (2013.01); *H04N 19/30* (2014.11)

(58) Field of Classification Search
CPC .... H04L 65/60; H04L 65/4069; H04L 65/602; H04L 65/607; H04N 19/30; H04N 21/4325; H04N 21/4331; H04N 21/43622; H04N 21/631; H04N 21/432
USPC ......................................................... 709/231
See application file for complete search history.

(56) References Cited

U.S. PATENT DOCUMENTS

| | | |
|---|---|---|
| 6,496,980 B1 | 12/2002 | Tillman et al. |
| 6,510,177 B1 | 1/2003 | De Bonet et al. |
| 6,580,754 B1 | 6/2003 | Wan et al. |

(Continued)

FOREIGN PATENT DOCUMENTS

WO   2004057874   3/2005

OTHER PUBLICATIONS

International Search Report and Written Opinion dated Sep. 23, 2014 from related PCT Serial No. PCT/US2014/040391, 14 pages.

(Continued)

*Primary Examiner* — Tu Nguyen

(57) ABSTRACT

Methods and apparatuses for streaming content including a base layer and an enhancement layer. According to one implementation, a first stream is fetched including the base layer from an internet server storing the base layer. A second stream is fetched including the enhancement layer from a local storage with the local storage being in communication with a media player through a local area network or a bus. The base layer and the enhancement layer are combined to render the content at a higher resolution than just the base layer.

21 Claims, 7 Drawing Sheets

(56) References Cited

U.S. PATENT DOCUMENTS

| | | |
|---|---|---|
| 7,860,161 B2 | 12/2010 | Xu et al. |
| 8,094,719 B2 | 1/2012 | Liu et al. |
| 8,126,054 B2 | 2/2012 | Hsiang |
| 8,144,769 B2 | 3/2012 | Liu et al. |
| 8,190,677 B2 | 5/2012 | Myers et al. |
| 8,340,177 B2 | 12/2012 | Ji et al. |
| 2005/0117641 A1 | 6/2005 | Xu et al. |
| 2006/0029227 A1 | 2/2006 | Vleuten et al. |
| 2006/0200848 A1 | 9/2006 | Baldine-Brunel et al. |
| 2009/0295905 A1 | 12/2009 | Civanlar et al. |
| 2011/0164686 A1 | 7/2011 | Lu et al. |
| 2011/0299448 A1 | 12/2011 | Meier et al. |
| 2012/0110628 A1* | 5/2012 | Candelore ...... H04N 21/234327 725/110 |
| 2012/0257675 A1 | 10/2012 | Wang et al. |

OTHER PUBLICATIONS

Extended European Search Report dated Oct. 7, 2016 from related European Application No. 14803921.7, 8 pages.

\* cited by examiner

METHODS AND APPARATUSES FOR STREAMING CONTENT

CROSS-REFERENCE TO RELATED APPLICATIONS

This application claims the benefit of U.S. Provisional Application No. 61/829,959, filed on May 31, 2013, which is hereby incorporated by reference in its entirety.

BACKGROUND

Current adaptive streaming solutions compensate for a best-effort internet by providing high viewer quality when internet bandwidth is available, and providing lower viewer quality when internet bandwidth is reduced, such as due to congestion. As video resolutions and bit-rates increase, current adaptive streaming solutions are less able to consistently deliver high resolution video without fluctuations in quality.

BRIEF DESCRIPTIONS OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various implementations disclosed may be practiced without some of these specific details. In other instances, well-known structures and techniques have not been shown in detail to avoid unnecessarily obscuring the various implementations.

Figure 1A:
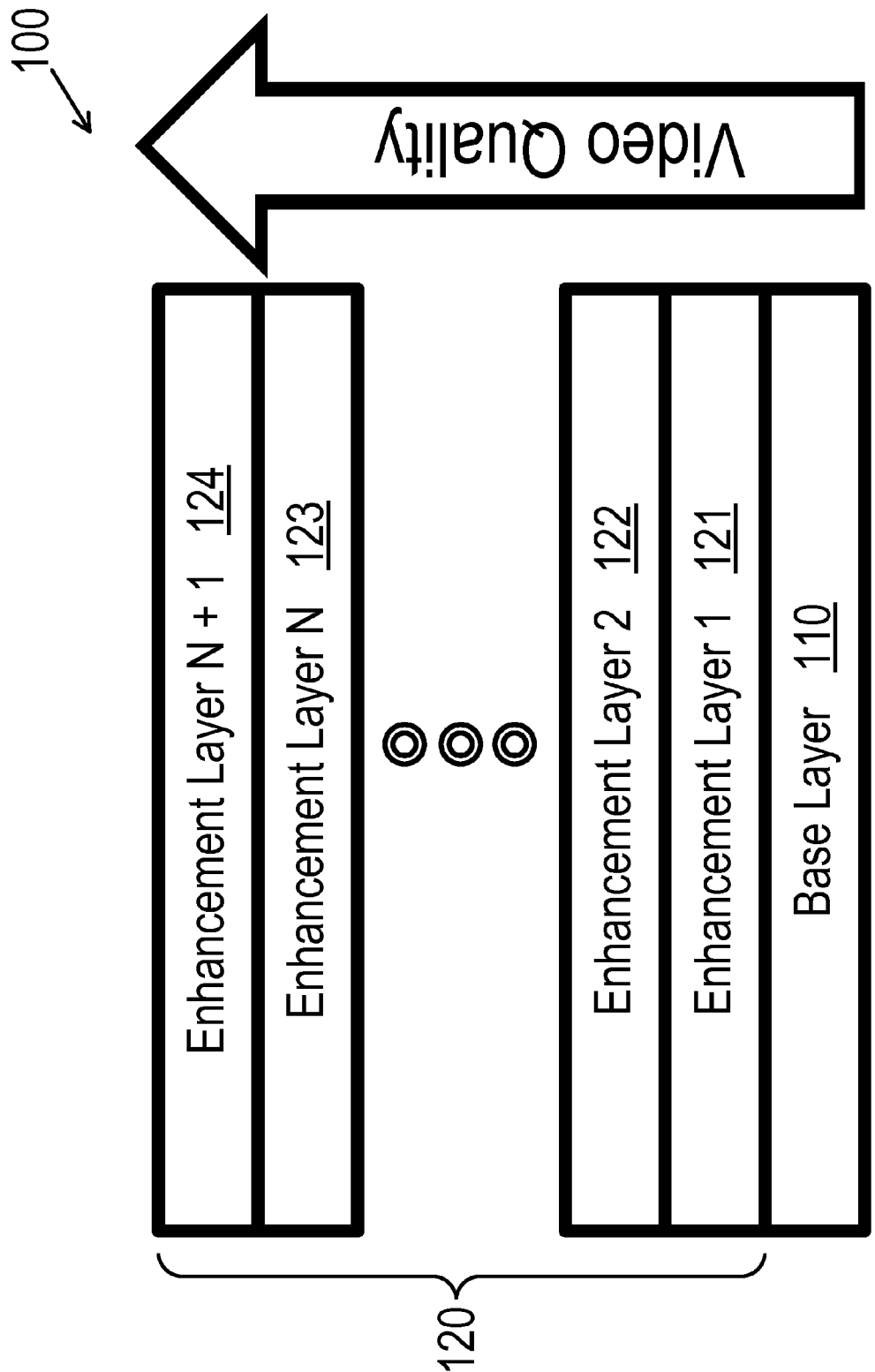
FIG. 1A illustrates layers of the Scalable Video Coding (SVC) standard.

FIG. 1A illustrates a layered coding scheme such as Scalable Video Coding (SVC), an extension of the H.264/AVC coding standard. Although the present disclosure discusses the SVC standard, the present disclosure is not limited to SVC, as other layered coding schemes may be used. SVC is a standard for encoding high-quality video bit-stream containing one or more subset bit-streams or layers. A new layer is derived by dropping packets from the larger video bit-stream, reducing the required bandwidth for the layer. The layer can represent a lower resolution, such as lower spatial resolution (smaller screen), lower temporal resolution (lower frame rate), or lower quality video signal. The lowest resolution layer, or base layer (layer 0), is also fully interoperable with AVC. To render a layer, a decoder requires the base layer as well as layers in between.

As seen in FIG. 1A, a bit-stream 100 may comprise a base layer 110 and enhancement layers 120. To render, for example, an enhancement layer N 123, the decoder requires the base layer 110 and an enhancement layer 1 121, an enhancement layer 2 122, and so on up to the enhancement layer N 123. Similarly, rendering an enhancement layer N+1 124 requires the enhancement layer N 123 down to the enhancement layer 1 121, and the base layer 110. As more enhancement layers 120 are rendered, the video quality is higher. For example, additional layers can increase the resolution (e.g., from Standard Definition to High Definition or 4K), increase the frame rate or bit rate, reduce visual artifacts, add 3D information or the like. However, only the base layer 110 is required to render video at its lowest quality (e.g., bit-rate or resolution).

The base layer 110 and the enhancement layers 120 are streamed through a best-effort internet or similar network. When the network encounters congestion or bandwidth is otherwise limited, the enhancement layers 120 may be discarded to ensure the base layer 110 is streamed without interruption. However, the video quality suffers degradation as the enhancement layers 120 are unavailable.

Conventionally, to stream high bit-rate video file, the high bit-rate video file is re-encoded into two different bit-rates, e.g., medium and low bit-rates. The three files (i.e. high, medium, and low bit-rates) are split into shorter segments, such as two second pieces. Depending on network congestion, the appropriate piece is streamed. For example, during high network congestion, the low bit-rate piece may be streamed. However, the video quality becomes highly dependent upon network congestion.

Figure 1B:
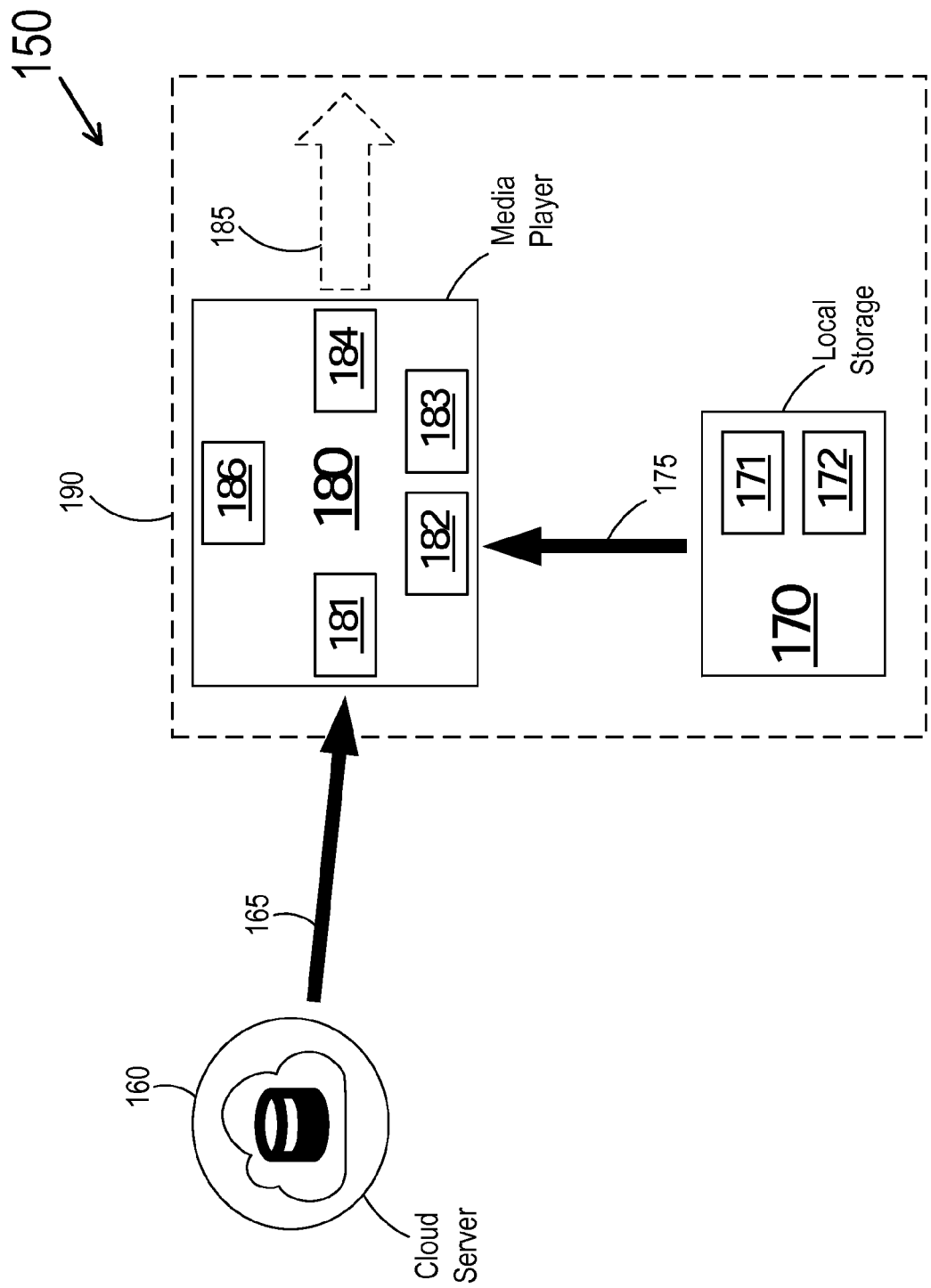
FIG. 1B illustrates a diagram of a video delivery system according to one implementation of the present disclosure.

FIG. 1B illustrates a video delivery system 150 which takes advantage of the scalability of SVC or other layered protocol stream to mitigate the vagaries of the internet. The video delivery system 150 may be compatible with other layered coding schemes and is not limited to the SVC standard. Rather than streaming the base layer 110 and the enhancement layers 120 through the internet, the layers are delivered from at least two sources.

FIG. 1B depicts a cloud server 160 or online server, a local area network (LAN) 190, a local storage 170, and a media player 180. The media player 180 may be a computer, smartphone, media streaming device, Blu-Ray player, or other device having a processor capable of re-multiplexing SVC layers or layers of another layered stream protocol. Alternatively, the media player 180 may be a specialized device or component of a larger device. The media player 180 may further include a memory 183, an output interface 184, and a processor 186. The cloud server 160 may be a streaming server or other computer capable of streaming data to the media player 180 through a network connection 165 and received by a network interface 181 of the media player 180. The network connection 165 may be established through the internet or a similar network, and may be wired or wireless.

The LAN 190 includes the local storage 170 and the media player 180. The local storage 170 streams data to the media player 180 through a local connection 175 and received by a local interface 182. The local storage 170 may be a network-attached-storage (NAS) having a controller 172 and a memory 171 which can include one or more drives for storing data, e.g., Hard Disk Drive (HDD), Solid State Drive (SSD), or hybrid drive (SSHD). The local storage 170 is connected to the media player 180 through the local connection 175. The local connection 175 may be a wired or wireless connection through the LAN 190. In other implementations, the local storage 170 may be one or more data storage devices (DSDs), such as an external hard drive or flash drive, connected to the media player 180 through the local connection 175, which may be a USB (universal serial bus) connection, Thunderbolt connection, or other bus connection. In yet other implementations, the memory 171 may include a removable memory media, such as optical media (CD, DVD, Blu-Ray, etc.) capable of storing data which is read by the media player 180 through the local connection 175. In such implementations, the media player 180, the local connection 175, and the local interface 182 may form part of an optical drive or other device for reading the media of memory 171.

Because the base layer 110 is the only required layer and also the lowest bit-rate, the base layer 110 can generally be streamed through a best-effort internet or other similar network without stuttering or otherwise being interrupted. The enhancement layers 120, which are not required for video content playback, often require more bandwidth than the base layer 110 to stream without pauses or interruptions. When streaming video content through a congested network, the enhancement layers are dropped, and the viewer experiences a degradation of video quality.

To reduce the fluctuations in video quality afforded by conventional adaptive streaming solutions, the enhancement layers 120 are streamed separately from the base layer 110. Specifically, the enhancement layers 120 are streamed through the local connection 175, which is usually a more reliable and/or less expensive connection than the network connection 165. Thus, the enhancement layers 120 will not be dropped due to congestion on the network connection 165. In other words, a level of congestion on the network connection 165 does not affect the ability to stream the enhancement layers 120 via the local connection 175. The processor 186 may then act as a re-multiplexer to remux the two streams. An output 185, which may be an encoded SVC stream or other layered stream, may be output through the output interface 184. In other implementations, the processor 186 may also decode the layered stream such that the output 185 is a video signal.

In certain implementations, the cloud server 160 streams the base layer 110 with one or more lower enhancement layers 120, such as the enhancement layer 1 121 and/or the enhancement layer 2 122. In other implementations, the local storage 170 may further comprise a plurality of local storage devices such that the enhancement layers 120 are streamed from more than one source.

The base layer 110 remains hosted on an internet server, allowing the content producer/provider to maintain control over its access. The enhancement layers 120 are distributed a priori to consumer storage devices. For example, the enhancement layers 120 may be preloaded onto the local storage 170 from the factory, or may be downloaded during off-peak hours. Thus, the enhancement layers 120 are made available independent of internet congestion. In addition, the enhancement layers 120 may be partitioned to store more layers in the cloud server 160 and less on the local storage 170, or vice versa.

Figure 2:
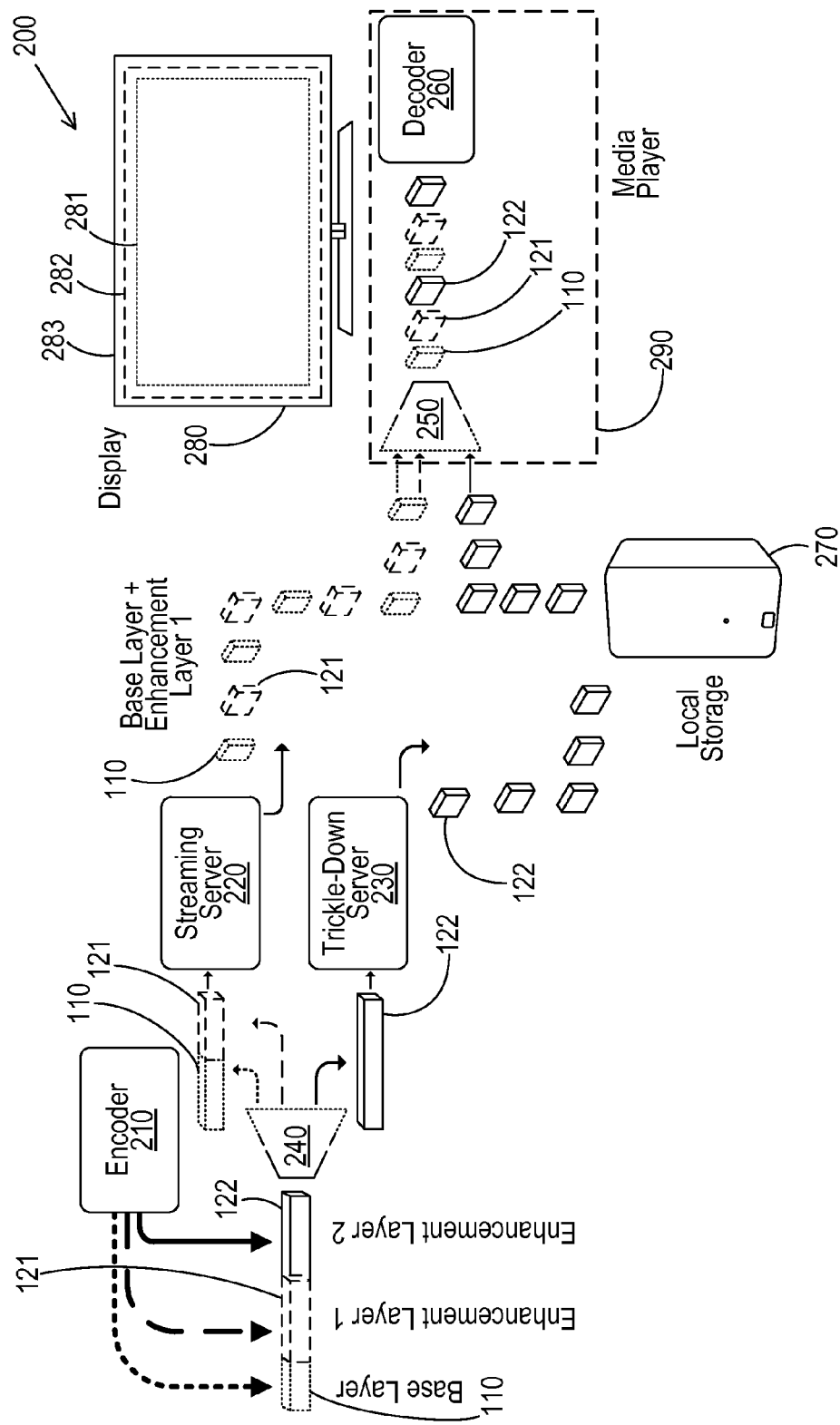
FIG. 2 illustrates a diagram of a video delivery system according to one implementation of the present disclosure.

FIG. 2 depicts a video delivery system 200. Prior to hosting a video stream, an encoder 210 (e.g., an SVC encoder) encodes video content into the base layer 110, the enhancement layer 1 121, and the enhancement layer 2 122. A de-multiplexor (demux) 240 multiplexes the layers, sending the base layer 110 and the enhancement layer 1 121 to a streaming server 220, and the enhancement layer 2 122 to a trickle-down server 230. A local storage (e.g., NAS) 270 downloads the enhancement layer 2 122 from the trickle-down server 230. The local storage 270 may download the enhancement layer 2 122 from the trickle-down server 230 during off-peak hours or at a rate slower than an acceptable streaming speed.

To playback the video content, the streaming server 220 streams the base layer 110 and the enhancement layer 1 121 to a re-multiplexor (remux) 250 of a media player 290, and the local storage 270 streams the enhancement layer 2 122 to the remux 250. The remux 250 re-multiplexes the base layer 110, the enhancement layer 1 121, and the enhancement layer 2 122 and outputs the re-multiplexed stream to a decoder 260 (e.g., an SVC decoder). The decoder 260 then decodes the stream for output on a display 280, such as a television, computer monitor, or mobile device screen.

When the enhancement layer 2 122 is available, a high resolution 283 can be output on the display 280. The enhancement layer 2 122 may not be available if the local storage 270 has not yet downloaded the enhancement layer 2 122. When the enhancement layer 2 122 is not available, the quality degrades to a medium resolution 282, but the degradation is graceful such that the overall workings and performance of the system is not drastically affected. If only the base layer 110 is available, then the display 280 outputs a lower resolution 281 or otherwise lower quality video.

Figure 3:
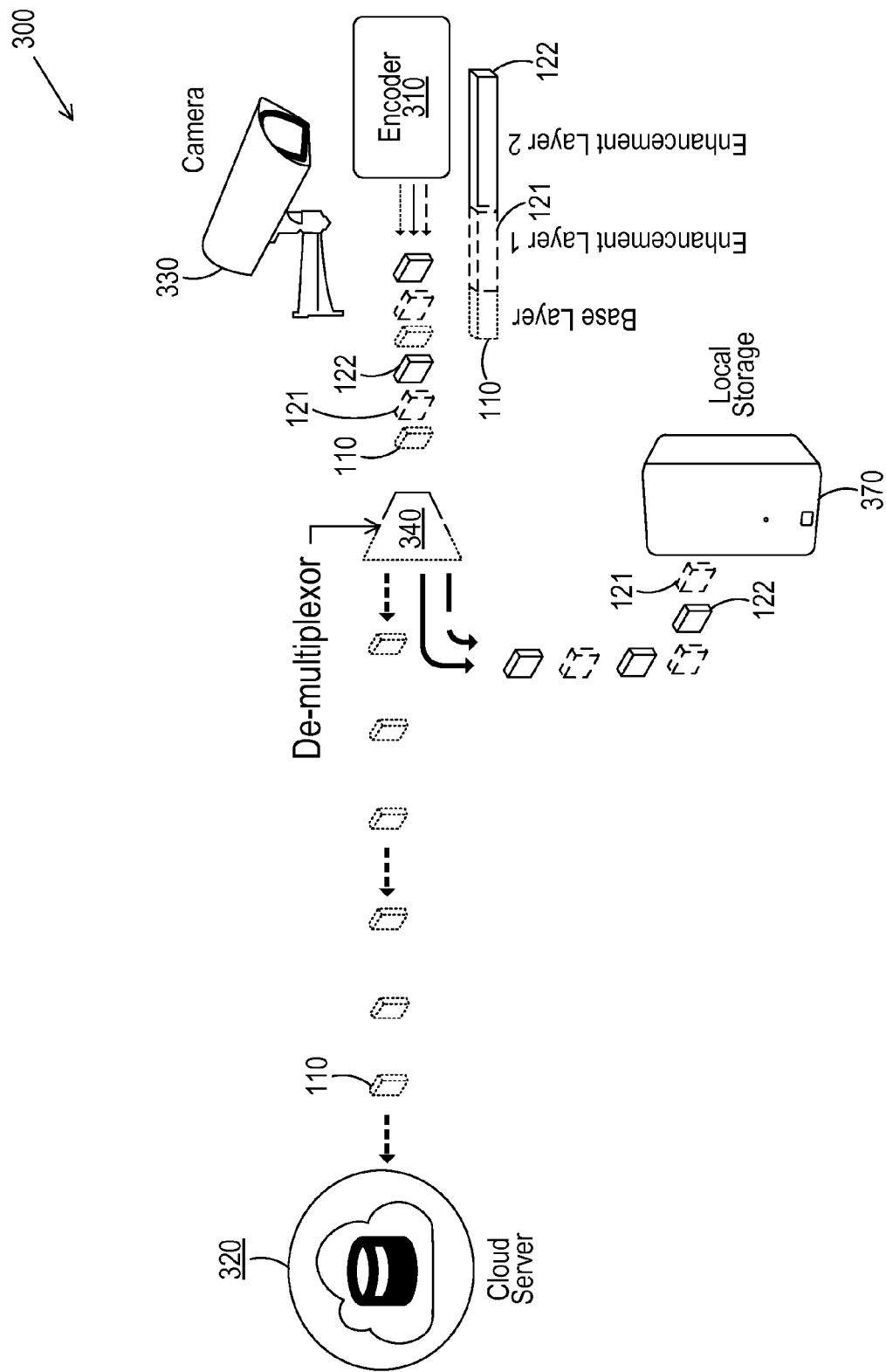
FIG. 3 illustrates a diagram of a video delivery system according to one implementation of the present disclosure.

FIG. 3 depicts a video surveillance system 300. A camera 330 records video, which is encoded by an encoder 310 (e.g., an SVC encoder) into the base layer 110, the enhancement layer 1 121, and the enhancement layer 2 122. A demux 340 de-multiplexes the stream and delivers the base layer 110 to a cloud server 320 and the enhancement layer 1 121 and the enhancement layer 2 122 to a local storage 370 (e.g., a NAS). The encoder 310 and/or the demux 340 may be integrated with the camera 330, or may be separate.

Storing the base layer 110 on the cloud server 320 allows a user to access the surveillance video remotely. For higher resolution video, the user can access the enhancement layers 120 stored on the local storage 370. The number of layers stored on the cloud server 320 may be predicated on the cost of cloud storage.

Figure 4:
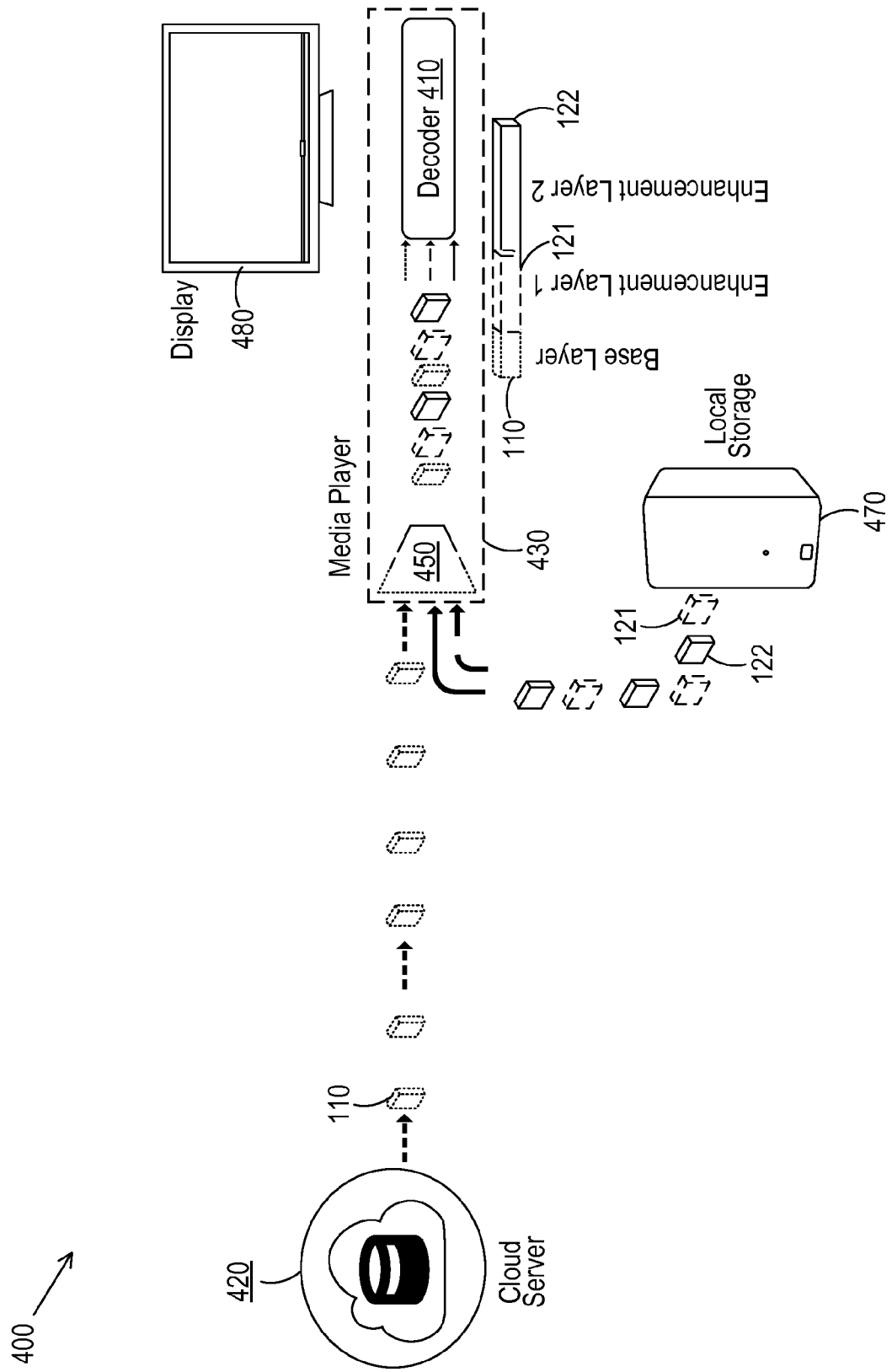
FIG. 4 illustrates a diagram of a video delivery system according to one implementation of the present disclosure.

FIG. 4 depicts a video delivery system 400. A cloud server 420 streams the base layer 110 to a remux 450 of a media player 430. A local storage 470 (e.g., a NAS), pre-loaded with the enhancement layer 1 121 and the enhancement layer 2 122, streams the enhancement layer 1 121 and the enhancement layer 2 122 to the remux 450. A decoder 410 (e.g., an SVC decoder) takes the remixed stream and outputs video to a display 480.

Because the base layer 110 is stored on the cloud server 420, access to the video content can be controlled by the cloud server 420. The enhancement layers 120 are completely dependent on the base layer 110 and cannot be played without the corresponding base layer 110. Therefore, even if the local storage 470 were compromised, the base layer 110 may remain secure on the cloud server 420. The content owner may host the base layer 110 on a secure server to protect the video content from piracy.

Figure 5:
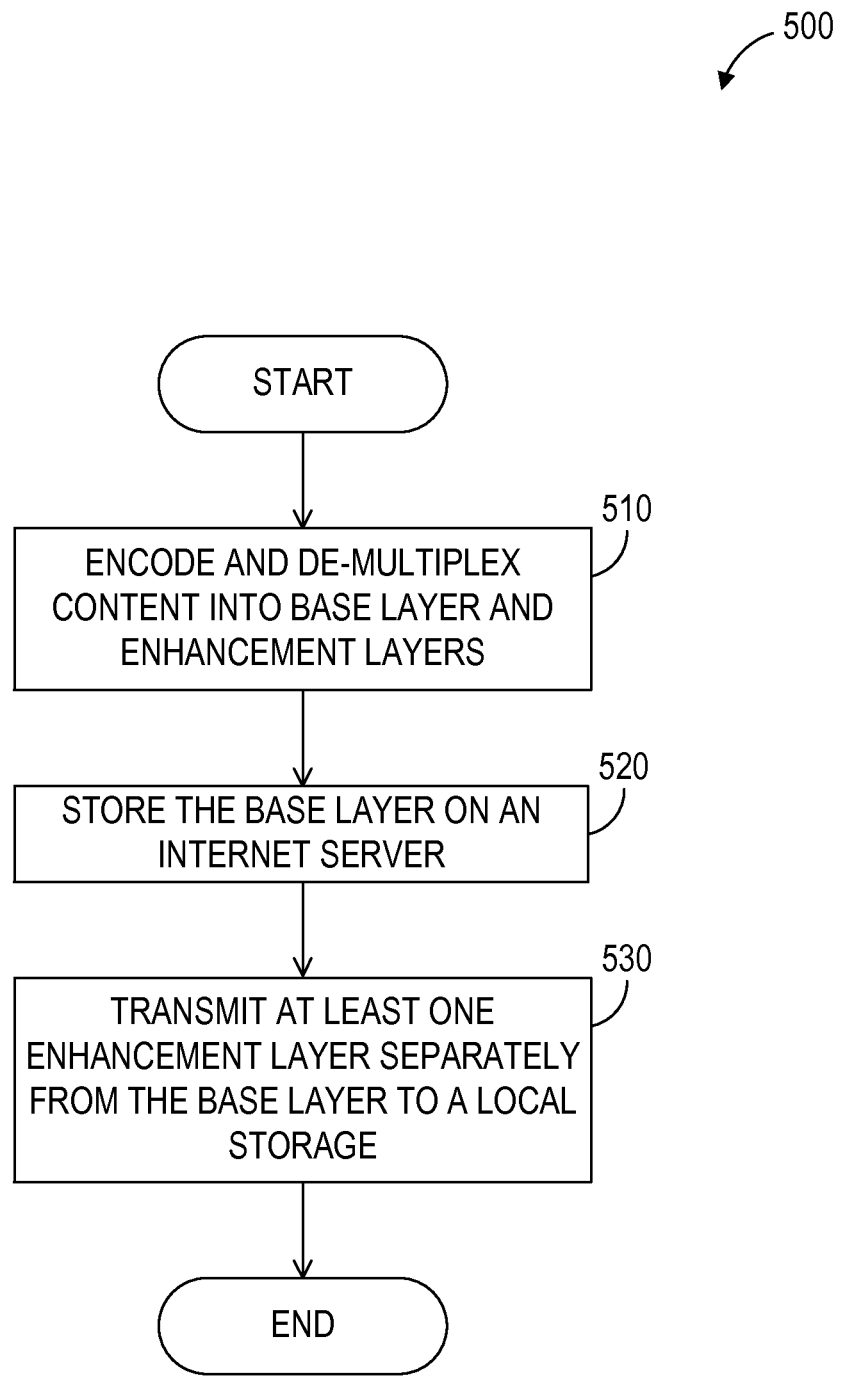
FIG. 5 illustrates a flowchart of an encoding process according to one implementation of the present disclosure.

FIG. 5 depicts a flowchart 500 of a video encoding process, as may be performed by the video surveillance system 300, for example. At 510, the video content, which may be generated by the camera 330, is encoded into an SVC stream or other layered protocol stream. A demux, such as the demux 340, demuxes the layered stream into base and enhancement layers.

At 520, the base layer is stored on an internet server, such as the cloud server 320. In certain implementations, one or more lower enhancement layers may be stored with the base layer on the internet server. At 530, at least one enhancement layer is transmitted to a local storage, such as the local storage 370.

Figure 6:
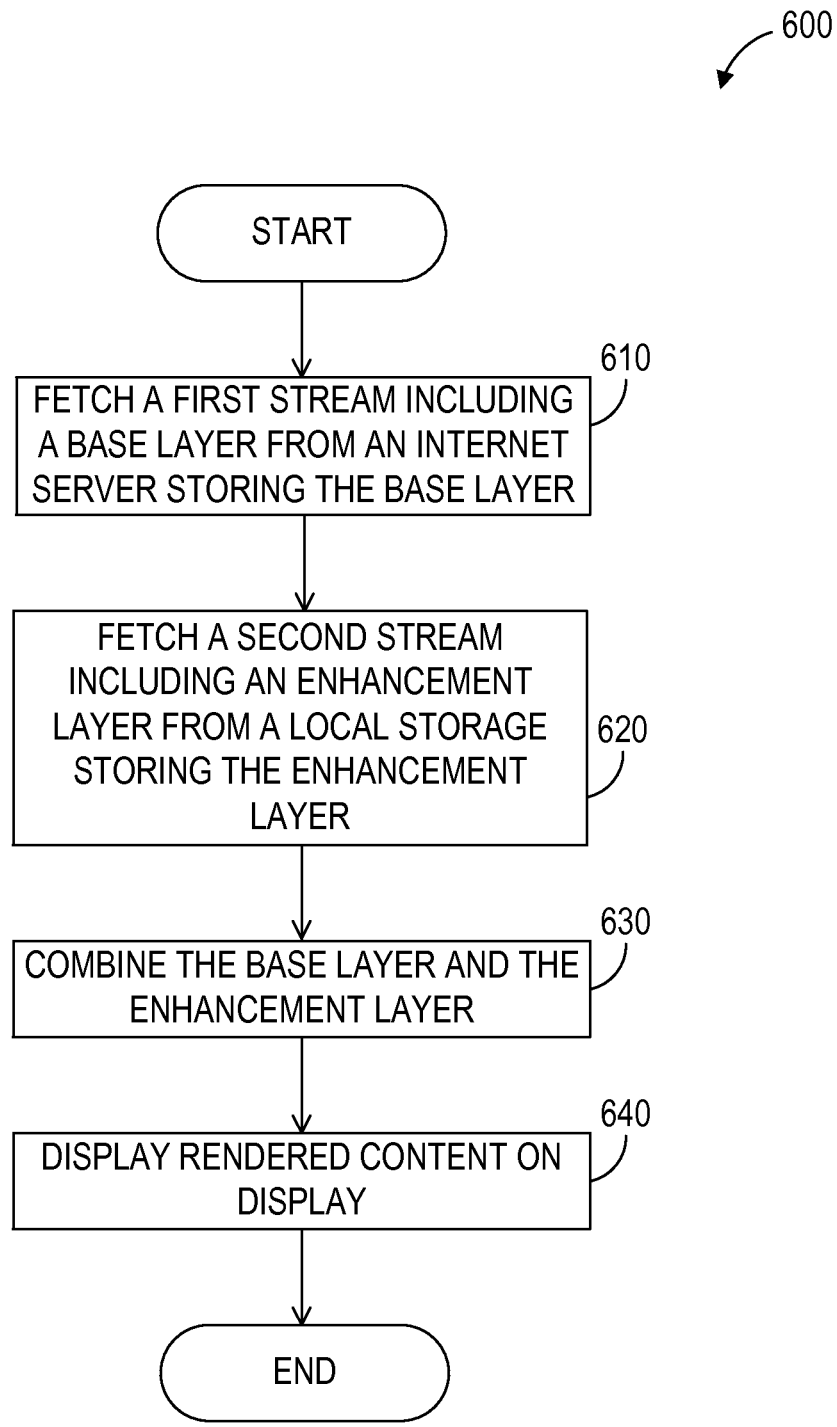
FIG. 6 illustrates a flowchart of a decoding process according to one implementation of the present disclosure.

FIG. 6 depicts a flowchart 600 of a video decoding process, as may be performed by the video delivery system 400, for example. At 610, a media player, such as the media player 430, fetches a first stream including a base layer from an internet server, such as the cloud server 420, storing the base layer. In certain implementations, the internet server may store lower enhancement layers, and the first stream further includes the lower enhancement layers. At 620, the media player fetches a second stream including an enhancement layer from a local storage, such as the local storage 470, storing the enhancement layer. In this regard, fetching the second stream can include accessing the enhancement layer from a memory which can include a removable memory media. In such implementations, the removable memory media may include an optical media such as a DVD or CD-ROM.

At 630, a remux, such as the remux 450, combines the base layer and the enhancement layer into an SVC stream or other layered protocol stream. At 640, a decoder, such as the decoder 410, decodes the layered stream to render the video content, which is then displayed on a display such as the display 480.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example implementations is provided to enable any person of ordinary skill in the art to make or use the implementations in the present disclosure. Various modifications to these examples will be readily apparent to those of ordinary skill in the art, and the principles disclosed herein may be applied to other examples without departing from the spirit or scope of the present disclosure. The described implementations are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A method for a media player to stream content including a base layer and an enhancement layer, the method comprising:
    using a Network Attached Storage (NAS) to download the enhancement layer via the internet for storage on the NAS, wherein the NAS is in communication with the media player through a local area network or a bus;
    fetching a first stream comprising the base layer from an internet server storing the base layer;
    fetching a second stream comprising the enhancement layer from the NAS storing the enhancement layer; and
    combining the base layer and the enhancement layer to render the content.

2. The method of claim 1, wherein the NAS comprises a plurality of data storage devices.

3. The method of claim 1, wherein the first stream further comprises a low level enhancement layer, the low level enhancement layer having a lower resolution than a resolution of the enhancement layer from the NAS.

4. The method of claim 1, wherein the enhancement layer is stored on the NAS before fetching the first stream from the internet server.

5. The method of claim 4, wherein at least one other enhancement layer is stored on the NAS as part of a manufacturing process of the NAS.

6. The method of claim 1, wherein fetching the second stream includes accessing the enhancement layer from a removable memory medium.

7. The method of claim 1, wherein fetching the second stream includes accessing the enhancement layer from an optical medium.

8. The method of claim 1, wherein the NAS downloads the enhancement layer from a trickle down server separate from the internet server storing the base layer.

9. A method for storing content including a base layer and a plurality of enhancement layers, the method comprising:
    storing the base layer on an internet server; and
    transmitting via the internet at least one enhancement layer of the plurality of enhancement layers to a Network Attached Storage (NAS) downloading the at least one enhancement layer, the at least one enhancement layer transmitted separately from the base layer, wherein the NAS is in communication with a media player through a local area network or a bus;

wherein the base layer and the at least one enhancement layer can be combined to render the content at a higher resolution than a resolution of the base layer by itself.

10. The method of claim 9, further comprising transmitting the base layer from the internet server to the media player, wherein the base layer is transmitted at a different time than when the at least one enhancement layer is transmitted to the NAS.

11. The method of claim 9, wherein the NAS comprises a plurality of data storage devices.

12. The method of claim 9, further comprising storing an enhancement layer of the plurality of enhancement layers on the internet server with the base layer.

13. The method of claim 9, further comprising encoding and de-multiplexing the content into the base layer and the plurality of enhancement layers before storing the base layer on the internet server and before transmitting the at least one enhancement layer to the NAS.

14. A media player for streaming content including a base layer and an enhancement layer, the media player comprising:
- at least one interface for receiving the base layer and the enhancement layer; and
- a processor configured to:
  - fetch a first stream comprising the base layer from an internet server storing the base layer;
  - fetch a second stream comprising the enhancement layer from a Network Attached Storage (NAS) storing the enhancement layer, wherein the NAS downloads the enhancement layer via the internet and the NAS is in communication with the media player through a local area network or a bus; and
  - combine the base layer and the enhancement layer to render the content.

15. The media player of claim 14, wherein the NAS comprises a plurality of data storage devices.

16. The media player of claim 14, wherein the first stream further comprises a low level enhancement layer, the low level enhancement layer having a lower resolution than a resolution of the enhancement layer from the NAS.

17. The media player of claim 14, wherein the enhancement layer is stored on the NAS before fetching the first stream from the internet server.

18. The media player of claim 14, wherein at least one other enhancement layer is stored on the NAS as part of a manufacturing process of the NAS.

19. The media player of claim 14, wherein fetching the second stream includes accessing the enhancement layer from a removable memory medium.

20. The media player of claim 14, wherein fetching the second stream includes accessing the enhancement layer from an optical medium.

21. The media player of claim 14, wherein the NAS downloads the enhancement layer from a trickle down server separate from the internet server storing the base layer.

* * * * *